United States Patent Office 3,613,169
Patented Oct. 19, 1971

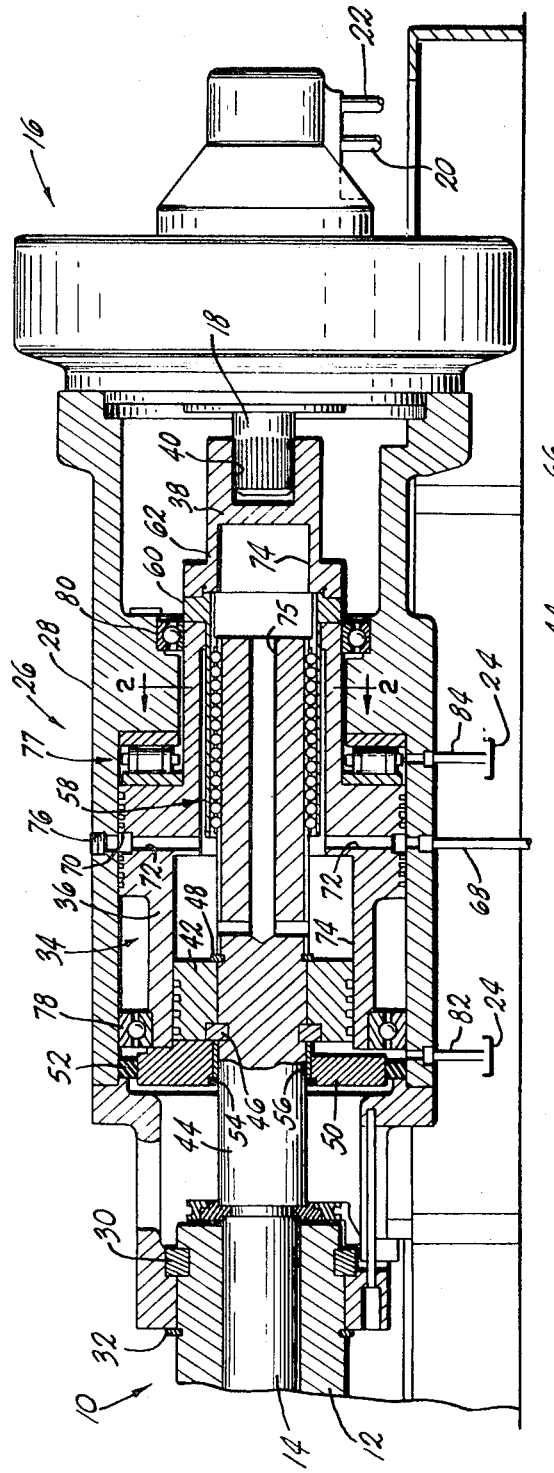

3,613,169
DRIVE ASSEMBLY FOR A RECIPROCATING SCREW EXTRUDER
William E. Ziegler, Ann Arbor, Mich., assignor to Hoover Ball and Bearing Company, Saline, Mich.
Filed May 5, 1970, Ser. No. 34,692
Int. Cl. B29f 1/02
U.S. Cl. 18—30 SS        8 Claims

ABSTRACT OF THE DISCLOSURE

Extruder apparatus for plasticizing and extruding organic plastic material which includes a drive assembly for reciprocating and continuously rotating the screw of the extruder. A hydraulic motor is provided for turning the screw at the speed of the motor. Mounted between the screw and the motor is a shot or hydraulic cylinder which is connected at the cylinder end to the rotary output shaft of the motor and at the piston rod end to the screw of the extruder. The piston and its rod are coupled for corotation with the cylinder by a ball spline assembly which allows free axial movement between the piston and the cylinder. The ball spline assembly is located within the pressure chamber of the cylinder so that it is lubricated by the hydraulic fluid supplied for actuating the hydraulic cylinder. The hydraulic fluid for the cylinder can be supplied from the same source that is available for operating the hydraulic motor.

BACKGROUND OF THE INVENTION

The present invention relates to a drive assembly for a reciprocating screw of an extruder for plasticizing and extruding organic plastic material.

Numerous arrangements have been suggested in the past for rotating and reciprocating the screw of such an extruder. Normally, such arrangements provide a gear or belt drive mounted adjacent to the end of the screw for turning the screw, and a power unit, such as a hydraulic cylinder, is mounted at a more remote location and has a shaft or rod extending through the power unit for reciprocating the screw. Such an arrangement leaves much to be desired from the standpoint of a unitary trouble free unit, although substantial improvements have been developed, such as that disclosed in U.S. Letters Pat. No. 3,335,457, issued Aug. 15, 1967, to Warren Martin, Jr., which provides an improved ball spline assembly which, among other advantages, reduces to a minimum friction between elements of the rotary drive coupling which must reciprocate axially relative to one another. However, the need still exists for further refinement of such drive assemblies, so that a more compact and simplified, trouble free and relatively low cost system is provided.

SUMMARY OF THE INVENTION

The present invention has overcome many of the shortcomings of the prior art and provides an improved drive assembly for a reciprocating screw extruder wherein a single power unit is the source of the thrust for the reciprocating screw, is the driving means for rotating the screw, and also serves as the source of lubrication for the ball spline assembly, which is provided to assure minimum friction during the reciprocating action of the rotating screw.

According to one form of the present invention apparatus for plasticizing and extruding thermoplastic material is provided including a rotatable screw member which is mounted in an extruder barrel for reciprocation in an axial direction. Hydraulic motor means are provided having a rotary output member in axial alignment with the screw member, and a stationary housing is mounted between the extruder barrel and the motor means. A piston-and-cylinder assembly is supported for rotation within the housing, the piston of the assembly being connected to the screw member and the cylinder of the assembly being connected to the rotary output member so that expansion and contraction of the assembly will reciprocate the screw member. The piston and the cylinder are coupled for corotation by a ball spline assembly that provides relatively low frictional resistance so that there is relatively no impedance resulting from the expansion and contraction of the piston-and-cylinder assembly. Fluid supply means are provided for introducing fluid under pressure to the cylinder for expanding the piston-and-cylinder assembly, and the same fluid is available to lubricate the ball and spline assembly which is located within the pressure chamber of the cylinder. Thus, a single source of fluid under pressure can be utilized to rotate the hydraulic motor means and to actuate the piston and cylinder assembly, and the single power unit provides the thrust for reciprocating the screw and at the same time provides the means for rotating the screw.

Accordingly, it is an object of the present invention to provide improved drive means for rotating and reciprocating a rotatable screw of an extruder adapted for plasticizing and extruding thermoplastic material.

Other objects of this invention will appear in the following description and appended claims, reference being had to the accompanying drawing forming a part of this specification wherein like reference characters designate corresponding parts in the several views.

BRIEF DESCRIPTION OF THE DRAWING

FIG. 1 is a longitudinal vertical section through a drive assembly for a reciprocating screw extruder embodying the present invention, only a fragmentary portion of the extruder being shown; and FIG. 2 is an enlarged section taken on the lines 2—2 of FIG. 1.

DESCRIPTION OF THE PREFERRED EMBODIMENT

Before explaining the present invention in detail, it is to be understood that the invention is not limited in its application to the details of construction of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. Shown fragmentarily in FIG. 1 is one end of an extruder 10 which includes an extruder barrel 12 in which is supported for rotation and reciprocation an extruder screw or screw member 14, only the shank of which is shown. Mounted in spaced relation to the extruder 10 is an hydraulic motor means 16 which has a rotary output member 18 in axial alignment with the screw member 14.

The motor means 16 preferably is a hydraulic Staffa motor, which is a low speed, high torque, piston motor capable of smooth operation from about 5 r.p.m. up to well beyond the maximum screw speed of 90 r.p.m. Hydraulic fluid is supplied to the motor means via the inlet conduit 20, and fluid is returned from the motor means 16 via the outlet conduit 22 to a suitable reservoir 24.

Mounted between the screw member 14 and the rotary output shaft member 18 is a drive unit 26 which contains a housing 28 secured at its one end to the housing of the motor means 16, and secured at its other end to the extruder barrel 12 by means of the split ring 30 and the snap ring 32. Located within the housing 28 and mounted for rotation about the axis of screw member 14 and output member 18 is the shot cylinder or piston-and-cylinder assembly 34. The latter includes the cylinder 36 which is closed at its one end 38 and is fitted by suitable splines 40 onto the end of the rotary shaft member 18 for rotation therewith. The shot cylinder or piston-and-cylinder assembly 34 also includes the piston 42 which is mounted on the piston rod or inner ball spline shaft 44 and is retained axially in place by means of the split ring 46 and snap ring 48. The bore of the cylinder 36 is closed at the other end thereof by means of the cap 50 which is adapted to rotate with the cylinder 36 and is sealed with respect to the housing 28 by the seal ring 52 and the ball spline shaft seal 54. A bushing 56 is positioned between the piston rod or ball spline shaft 44 and the cap 50 to function as a radial bearing shaft 44 and to allow free reciprocal movement of the ball spline shaft 44 relative to the cap 50.

A ball spline assembly 58 is provided between the piston rod 44 and the cylinder 36 so that corotation of these members will always occur, while substantially friction free relative reciprocal movement can occur. The ball spline assembly 58 includes the outer ball spline 60, the spline adapter 62, the plurality of balls 64, the shell 66 which lies between the outer ball spline 62 and the inner ball spline shaft 44 and which functions to separate the balls so that they do not touch each other as they roll back and forth in the splines of the inner and outer splines 44 and 60. By virtue of this arrangement, the inner and outer ball spines 44 and 60 are retained together for corotation, but they may freely reciprocate relative to one another. For a further description of this assembly, reference is made to prior U.S. Pat. No. 3,335,457.

Extending into the housing 28 is a conduit 68 which may be in communication with the same source of hydraulic fluid under pressure that supplies hydraulic fluid to the main motor 16 via the conduit 20. The cylinder 36 is provided with an annular groove 70 circumscribing its outer surface and in communication with at least a pair of radially inwardly directed ducts 72 which supply hydraulic fluid under pressure into the chamber 74 defined within the cylinder 36 on the pressure side of the piston 42. The chamber 74 also encloses and provides lubricating fluid to the ball spline assembly 58 so that the latter is always properly lubricated. A duct 75 is provided through inner ball spline 44 for the rapid movement of hydraulic fluid between ducts 72 and the portion of chamber 74 to the rear of inner spline 44. If duct 75 did not exist, this hydraulic fluid movement would have to pass through the narrow space between inner spline 44, shell 66 and outer spline 60 creating some resistance to flow and possibly creating excessive heat. For air bleed purposes the normally closed bleed port 76 is provided.

In the described embodiment of the invention, because the extruder screw is rotating continuously by operation of the motor means 16, the production of melted plastic in the extruder 10 is continuous. During the time when the plastic that is produced must be stored to await the next shot, storage takes place in the barrel 12.

When the shot of melted plastic is to occur, a hydraulic valve, not shown, controlling the shot cylinder 34 applies high pressure to the chamber 74 within the cylinder 38 which moves the piston 42 to the forward position shown in FIG. 1, and this has the simultaneous effect of moving the screw 14 forward, forcing the molten plastic ahead of it through the nozzle, not shown, of the extruder. When the screw reaches the forward position, the hydraulic valve (not shown) shifts, connecting the shot cylinder to a relief valve, and at this point the plastic has an easier task moving the screw 14 to the rear than it has going through the die head of the extruder. The plastic being produced, thus accumulates in the barrel again, at the end of the screw and forces it to retract. When the next shot is required, the hydraulic valve (not shown) again shifts to high pressure, moving the piston 42 and thereby the screw member 14 forward, forcing the stored plastic through the die head of the extruder.

When extrusion occurs as described above, a substantial thrust is exerted through the cylinder 36, and a thrust bearing 77 is provided between the cylinder 36 and the housing 28 to accommodate this thrust. Similarly, radial bearings are also provided at 78 and 80 to accommodate the rotary action of the piston-and-cylinder assembly 44 within the housing 28.

It will be noted that drain ports 82 and 84 are provided through the lower walls of the housing 28 so that leakage of hydraulic fluid around the piston 42 and the cylinder 36 can be utilized to provide lubrication for the thrust and radial bearings, 77, 78 and 80, and this hydraulic fluid can then be returned to the source 24.

From the foregoing description it will be recognized that a unitary main drive has been provided which can readily supply both rotary and reciprocal movement to the extruder screw member 14, and which can also supply lubricating means for an extremely efficient ball spline arrangement that is utilized to minimize the frictional resistance that normally would occur and which would impede the retracting movement of the screw member 14 during the time that the material is being plasticized and accumulated within the barrel 12. The advantages of such a ball spline arrangement are more specifically set forth in the aforesaid U.S. Letters Pat. No. 3,335,457.

I claim:

1. In apparatus for plasticizing and extruding thermoplastic material wherein a rotatable screw member is mounted in an extruder barrel for reciprocation in an axial direction, the combination comprising motor means having a rotary output member in axial alignment with said screw member, a stationary housing mounted axially between said extruder barrel and said motor means, a piston-and-cylinder assembly supported for rotation within said housing, the piston of said assembly being connected to one of said members and the cylinder of said assembly being connected to the other of said members so that expansion and contraction of said assembly will reciprocate said screw member, said piston and said cylinder being coupled for corotation, and fluid supply means for introducing fluid under pressure to said cylinder for expanding said assembly to move said screw member in one axial direction.

2. Apparatus that is defined in claim 1, wherein said piston and said cylinder are coupled for corotation by a ball spline assembly so that relatively low frictional resistance exists to impede expansion and contraction of said piston-and-cylinder assembly.

3. Apparatus that is defined in claim 2, wherein said ball spline assembly and the fluid pressure side of the piston-and-cylinder assembly are in a common chamber so that lubrication of said ball spline is provided by the fluid from said supply means.

4. Apparatus that is defined in claim 3, wherein said common chamber is defined by said cylinder which includes a closed end portion connected to said rotary output member, and which has a bore in which is located an outer ball spline, and said piston includes a rod portion connected to said rotatable screw member and on which is located an inner ball spline extending into said outer ball spline, and a plurality of balls are retained between said outer ball spline and said inner ball spline to provide therewith said ball spline assembly.

5. Apparatus that is defined in claim 4, wherein a thrust bearing assembly is mounted axially between said cylinder and said stationary housing.

6. Apparatus that is defined in claim 5, wherein said thrust bearing assembly is in communication with a fluid drain port in said housing so that leakage of fluid from said cylinder can be utilized to lubricate said thrust bearing assembly and such fluid can then be discharged through said drain port.

7. Apparatus that is defined in claim 4, wherein radial bearings are provided between said cylinder and said housing, and said radial bearings are in communication with a fluid drain port in said housing so that leakage fluid from said cylinder can be utilized to lubricate said radial bearings and such fluid can be discharged through said drain port.

8. In apparatus for plasticizing and extruding thermoplastic material wherein a rotatable screw member is mounted in an extruder barrel for reciprocation in an axial direction, the combination comprising motor means having a rotary output member, a piston-and-cylinder assembly mounted between said rotatable screw member and said rotary output member, said assembly including a cylinder connected to said output member for rotation therewith, a piston rod connected at one of its ends to said screw member for rotation therewith, and a piston mounted on the midportion of said rod within said cylinder, said rod being coupled at its other end to said cylinder for corotation and for axial movement relative thereto, and fluid supply means for introducing fluid under pressure to said cylinder for expanding said assembly to move said screw in one axial direction while said screw is continuously rotating.

References Cited

UNITED STATES PATENTS

| | | | |
|---|---|---|---|
| 2,944,286 | 7/1960 | Kullgren et al. | 18—12 SA |
| 3,319,298 | 5/1967 | Kiraly | 18—30 SS |
| 3,335,457 | 8/1967 | Martin | 18—30 SSX |
| 3,509,601 | 5/1970 | Johansson | 18—30 SS |

FOREIGN PATENTS

| | | | |
|---|---|---|---|
| 1,426,661 | 12/1965 | France | 18—30 SS |
| 1,046,397 | 10/1966 | Great Britain | 18—12 SA |

J. SPENCER OVERHOLSER, Primary Examiner

M. O. SUTTON, Assistant Examiner

U.S. Cl. X.R.

18—12 SA; 92—2